United States Patent
DeLong

(10) Patent No.: US 6,462,846 B1
(45) Date of Patent: Oct. 8, 2002

(54) SHARED TELESCOPE OPTICAL COMMUNICATION TERMINAL

(75) Inventor: Raymond K. DeLong, Palos Verdes Estates, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/123,961

(22) Filed: Jul. 29, 1998

(51) Int. Cl.⁷ .............................. H04B 10/00; H01S 3/13
(52) U.S. Cl. ...................... 359/152; 359/153; 359/159; 372/29
(58) Field of Search ................................ 359/152, 153, 359/159

(56) References Cited

U.S. PATENT DOCUMENTS

| | | | |
|---|---|---|---|
| 3,681,709 A | * 8/1972 | Brown | 331/94.5 |
| 4,165,936 A | 8/1979 | Eisenring | 356/5 |
| 4,223,986 A | * 9/1980 | Choate | 353/80 |
| 4,504,111 A | * 3/1985 | Hunzinger | 350/96.2 |
| 4,521,068 A | * 6/1985 | Schulte in den Baumen | 350/1.1 |
| 4,594,509 A | * 6/1986 | Simon et al. | 250/338 |
| 4,647,777 A | * 3/1987 | Meyer | 250/339 |
| 4,684,248 A | * 8/1987 | Cinzori | 356/152 |
| 5,285,461 A | 2/1994 | Krasutsky | 359/29 |
| 5,347,387 A | * 9/1994 | Rice | 359/152 |
| 5,390,040 A | 2/1995 | Mayeux | 359/152 |
| 5,465,170 A | * 11/1995 | Arimoto | 359/159 |
| 5,491,550 A | * 2/1996 | Dabbs | 356/345 |
| 5,517,016 A | * 5/1996 | Lesh et al. | 250/201.1 |
| 5,652,750 A | * 7/1997 | Dent et al. | 370/326 |
| 5,689,354 A | * 11/1997 | Orino | 359/172 |
| 5,710,652 A | 1/1998 | Bloom | 359/152 |
| 5,777,768 A | 7/1998 | Korevaar | 359/172 |
| 5,854,713 A | * 12/1998 | Kuroda et al. | 359/850 |
| 5,870,215 A | * 2/1999 | Milano et al. | 359/172 |

* cited by examiner

Primary Examiner—Leslie Pascal
Assistant Examiner—Dalzid Singh
(74) Attorney, Agent, or Firm—McAndrews, Held & Malloy, Ltd.

(57) ABSTRACT

An optical communication terminal includes transmit and receive paths along which optical transmit and receive energy passes. The terminal includes a telescope with a housing, a primary mirror and a secondary mirror. The primary mirror directs received beams to a secondary mirror and directs the optical transmit energy out of the telescope in a transmit beam. A secondary mirror is placed confocal to the primary mirror so that optical transmit energy is directed by the secondary mirror to the primary mirror. An annular mirror is positioned along the transmit path and along the receive path. The annular mirror passes the optical transmit energy from the transmit path into a shared path and passes the received optical energy from the shared path into the receive path. Preferably, the secondary mirror is a dichroic lens that reflects optical energy at the wavelength of the receive beam.

3 Claims, 2 Drawing Sheets

SHARED TELESCOPE OPTICAL COMMUNICATION TERMINAL

BACKGROUND OF THE INVENTION

The present invention relates to optical communication terminals. In particular, the present invention relates to an optical communication terminal that includes a telescope shared by both transmitted and received optical energy.

Ground based communications systems commonly transmit and receive signals at radio frequency (RF) wavelengths. RF transmissions are suitable for ground systems due to the relative insensitivity of RF signals to atmospheric effects. Atmospheric effects, which include rain attenuation and scintillation, for example, would significantly attenuate optical transmissions.

Furthermore, the well established and well understood nature of RF communications has made it the prevalent communication technology for space based systems. From its inception, satellite technology has employed RF communications. In space, or any other environment that is free of atmospheric effects, however, optical communications techniques may be employed to transmit and receive information at data rates far greater than those of RF communications.

The preference for RF communications, unfortunately, has resulted in less emphasis being placed on design and development of optical communication systems. Thus, in the past, few optical communications systems have been designed and fewer have been implemented on the ground. No commerical optical communication systems currently fly in space.

One previous conceptual approach to implementing an optical communication system centers around an optical communication terminal ("terminal") with two optical communication paths, a transmit path and a receive path. The transmit path provides a physical path for transmit optical energy, while the receive path provides a physical path for received optical energy. The optical energy propagates along the transmit path and leaves the terminal through a transmit aperture, while the optical energy that propagates along the receive path first enters the terminal through a receive aperture separate from the transmit aperture.

Typically, a set of optics is required for the receive aperture to focus and direct the received optical energy into the receive path. An additional set of optics is required for the transmit aperture to expand and direct the transmitted optical energy outward through the transmit aperture. The transmit optics and receive optics are mounted, typically, in a structure and the combination is commonly referred to as a telescope. The opening in the telescope through which a transmitted beam leaves, or through which a received beam enters is commonly referred to as the transmit aperture and receive aperture, respectively.

Implementing a terminal with separate transmit and receive apertures has several drawbacks however. One drawback is that the mechanical complexity, cost, and size of the terminal are increased due to the need for separate transmit and receive telescopes, separate receive and transmit paths, and separate sets of optics for the transmit aperture and the receive aperture.

Another drawback is that the transmit telescope and the receive telescope separately experience mechanical stresses. Mechanical stresses on the transmit telescope and the receive telescope may, for example, cause misalignment of the transmit aperture independently of any misalignment of the receive aperture. Misalignment in the transmit aperture, in turn, may cause the terminal to send the transmit beam in a direction not aligned to the destination terminal. Additionally, misalignment in the receive aperture may result in the terminal communication detector receiving less or no optical energy from other transmitting terminals.

As a result, the conceptual design for an optical communication terminal using separate transmit and receive telescopes requires additional hardware to maintain very accurate co-alignment between the transmit and the receive telescopes. Maintaining co-alignment is a particular problem in space based systems which operate over extreme ranges of temperature. Thus, in the past, the initial concepts for optical communication terminals have been unduly complicated, bulky and costly, as well as mechanically unstable.

An additional design problem that must be addressed is the initial alignment (also referred to as acquisition) of individual terminals so that they may communicate with one another. Acquisition is an important, non-trivial problem because the transmit beam is typically extremely narrow. Even very small misalignments between a transmitting terminal and a receiving terminal may result in the transmit beam completely missing the receiving terminal.

One conceptual approach to initial alignment uses a beacon transmitter that independently emits a beacon beam of additional energy that is much broader than the transmit beam. The broader beacon beam is then received by a separate telescope on each terminal. The separate telescope includes optics which focus and direct the beacon beam into the terminal for acquisition purposes. This approach shares the disadvantages of the conceptual terminal design, however, in that the separate telescope and associated optics for the beacon beam increase the size, cost, and complexity of the terminal.

A need has long existed in the industry for an optical communication terminal which overcomes the disadvantages cited above and previously experienced.

BRIEF SUMMARY OF THE INVENTION

It is an object of the present invention to provide an optical communication terminal.

It is another object of the present invention to provide an optical communication terminal having shared transmit and receive optical elements.

Yet another object of the present invention is to share a single telescope for both a transmit beam and a receive beam in an optical communication terminal.

Another object of the present invention is to provide an optical communication terminal that shares a single telescope between the transmit beam, the receive beam, and the acquisition beacon beam received.

Yet another object of the present invention is to use an annular mirror in an optical communication terminal to allow a shared transmit and receive path and a shared telescope in the optical communication terminal.

A still further object of the present invention is to allow an optical communication terminal to use a transmit beam that is the same wavelength as the receive beam.

Another object of the present invention is to allow an optical communication terminal to use a transmit beam that has a different wavelength than the receive beam.

It is an object of the present invention to provide a charge coupled device (CCD) as a wide field of view beacon detector.

It is another object of the present invention to integrate a CCD beacon detector into a telescope that is also used to handle transmit beams and receive beams.

The optical communication terminal of the present invention includes a transmit path along which optical transmit energy passes and a receive path along which received optical energy passes. In addition, a shared path exists in the optical communication terminal along which both the received optical energy and the optical transmit energy pass.

A telescope is provided that is constructed using a housing, a primary mirror placed inside or at one end of the housing and a secondary mirror placed at the other end. The primary mirror directs received beams to a secondary mirror and directs the optical transmit energy out of the telescope in a transmit beam. A secondary mirror is placed confocal with the primary mirror which directs transmit optical energy to the primary mirror. The secondary mirror further directs a received communication beam into the shared path as received optical energy.

An annular mirror is positioned along the shared path. The annular mirror passes the optical transmit energy from the transmit path into the shared path and also passes the received optical energy from the shared path into the receive path.

The optical communication terminal may also include a beacon transmitter that emits a beacon beam used for acquisition. A CCD or other detector may then be provided to detect the beacon beam. Preferably, the secondary mirror is a dichroic element that reflects optical energy at the wavelength of the receive beam (and transmit beam) off of the front surface and that forms a lens which passes and focuses optical energy at the wavelength of the beacon beam. The CCD may then be placed behind the secondary mirror lens to detect the beacon beam.

DETAILED DESCRIPTION OF THE INVENTION

Figure 1:
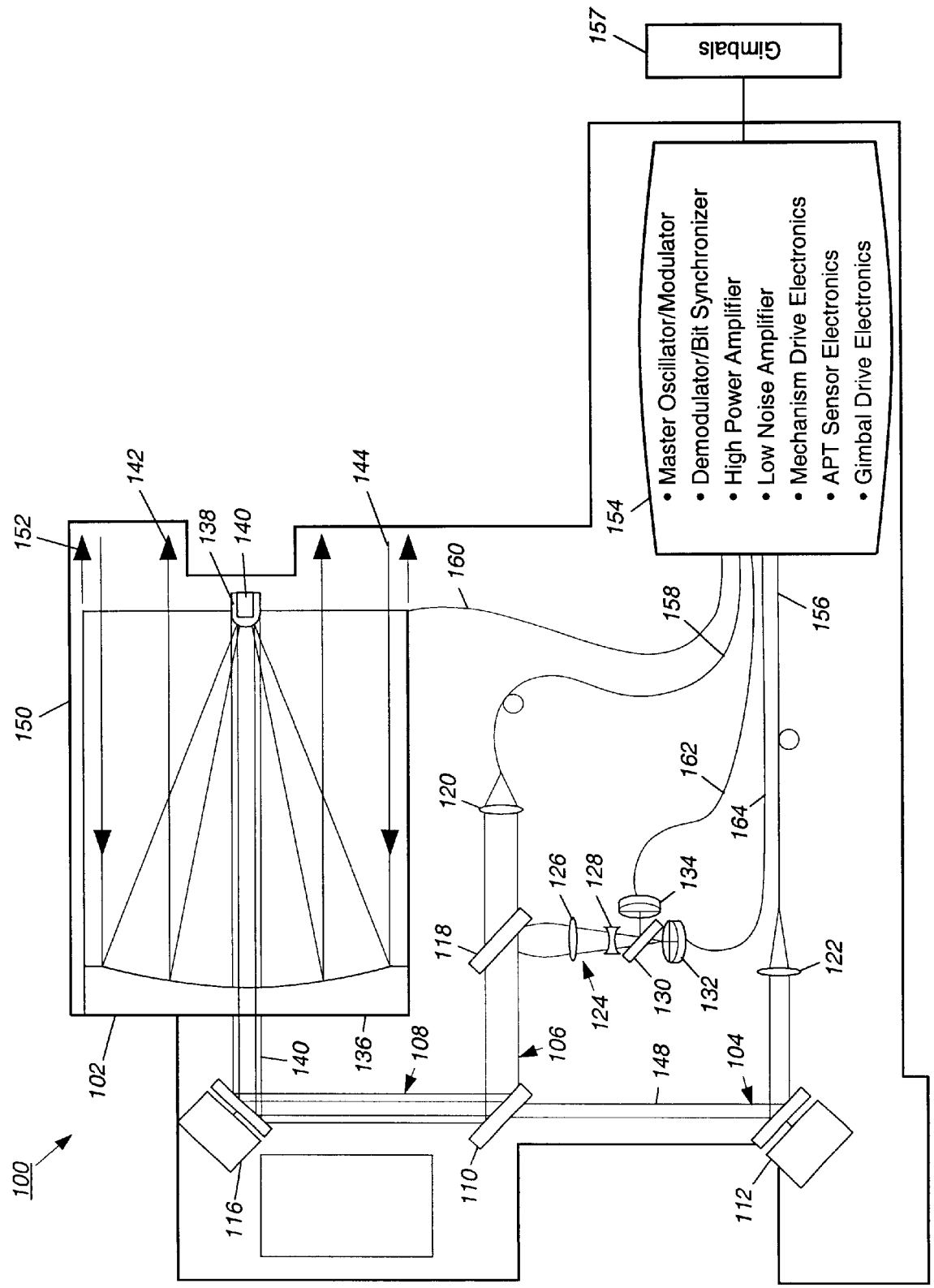
FIG. 1 illustrates an optical communication terminal that shares a single telescope between transmit beams and receive beams.

Turning now to FIG. 1, that figure illustrates one embodiment of an optical communication terminal 100. The terminal 100 includes a telescope 102, a transmit path 104, a receive path 106, and a shared path 108. An annular mirror 110, point-ahead-mirror (PAM) 112, and a fine-tracking-mirror (FTM) 116 are also present. A receive beamsplitter 118 and coupling lens 120 are located in the receive path 106, and a transmit collimating lens 122 is located in the transmit path 104.

The transmit path 104, receive path 106, and shared path 108 provide a physical path along which optical communication energy travels. Thus, for example, the transmit path 104 provides a physical path along which the optical transmit energy 148 propagates. The transmit path 104, receive path 106, and shared path 108 are not limited to any particular shape or construction and may, for example, include angular bends.

The terminal 100 also includes a tracking detector system 124. The tracking system 124 includes a biconvex lens 126, a biconcave lens 128, and a tracking beamsplitter 130. A first quad-cell detector 132 and a second quad-cell detector 134 are also provided in the tracking detector system 124.

The telescope 102 includes a primary mirror 136, a secondary mirror 138, and a charge coupled device (CCD) array 140. A transmit beam 142 and receive beam 144 are illustrated leaving and entering the telescope 102, respectively. Received optical energy 146 and optical transmit energy 148 are also illustrated. FIG. 1 also shows a beacon transmitter 150 producing a beacon beam 152.

Generally indicated in FIG. 1 is a set of communication and control electronics 154. The communications and control electronics 154 generate communication signals that will be coupled into the transmit fiber 156 and also process received optical energy provided on the receive fiber 158. Electrical conductors 160–164 connect the communications and control electronics 154 to the PAM 112, FTM 116, gimbals 157, beacon 150, CCD 140, first quad-cell detector 132 and second quad-cell detector 134.

Still with reference to FIG. 1, the path followed by the transmit optical energy 148 is discussed. In operation, a portion of the control electronics 154 generates a signal to be transmitted. The signal is coupled into the transmit fiber 156 as an optical signal and subsequently propagates down the transmit fiber 156 to the transmit collimating lens 122. In general, a collimating lens is a lens that refracts optical energy as it passes into and out of the lens to adjust the wavefronts of the optical energy to be substantially parallel after leaving the lens. The optical signal passes through the collimating lens 122 after which it is referred to as the optical transmit energy 148.

The optical transmit energy 148 propagates along the transmit path 104 until it reaches the PAM 112. The PAM 112 reflects the optical transmit energy 148 so that it continues to propagate along the transmit path 104 to the annular mirror 110. The PAM 112 is also used to introduce an angular offset to the optical transmit energy 148 that compensates for the propagation delay required for the transmit beam 142 to reach a destination receiver.

Because the propagation delay is typically very small due to the enormous velocity of light, the PAM 112 typically introduces an angular offset to the optical transmit energy 148 on the order of microradians. The angular offset ensures that the transmit beam 142 leads the destination receiver to compensate for the relative motion of the terminal 100 and the destination receiver as well as the propagation delay of the transmit beam 142.

A PAM 112 suitable for use in the present invention may be constructed using a mirror mounted on a feature gimbal. The feature gimbal rotates in response to an attached servo motor that pushes and pulls on the gimbal. A sensor that detects the amount of rotation may be provided to implement closed loop control over the PAM 112.

As noted above, the optical transmit energy 148 continues along the transmit path 104 until it reaches the annular mirror 110. The annular mirror 110 has a hole in its center that allows at least a portion of the optical transmit energy 148 to pass through. As one of many possible implementation examples, the optical transmit energy 148 may be approximately 1 cm in diameter (as controlled by the connection of the transmit fiber 156 to the transmit collimating lens 122), while the hole may be likewise approximately 1 cm.

The optical transmit energy 148 passes through the annular mirror 110 and propagates along the shared path 108 until it reaches the FTM 116. The FTM 116 may be constructed in the same fashion as the PAM 112. The FTM 116 operates in conjunction with the tracking detector system 124 to align the received optical energy 146. The tracking system attempts to maximize the amount of received optical energy 146 entering the receive fiber 158 (as will be explained in more detail below).

The optical transmit energy 148 reflects off of the FTM 116 and enters the telescope 102 (which may be constructed, for example, from glass mirrors and a graphite tube). The optical transmit energy 148 then propagates to the secondary mirror 138. The secondary mirror 138 is shown in FIG. 1 as convex in shape. The secondary mirror therefore expands the incident optical transmit energy 148 and directs the reflected energy from the shared path 108 to the primary mirror 136. The primary mirror 136, which is concave in shape, collimates the incident reflected optical transmit energy and produces the transmit beam 142. Note that the primary mirror 136 and secondary mirror 138 have the effect of magnifying the diameter of the optical transmit energy to form the transmit beam 142. The diameter of the transmit beam 142, however, is still smaller than that of the receive beam 144.

Because the telescope 102 does not limit the diameter of the transmit beam 142, the aperture size associated with the transmit beam 142 is the same as the diameter of the transmit beam 142. The aperture size associated with the receive beam 144, however, is the diameter of the telescope 102. Note that the aperture size associated with the receive beam 144 is larger than the aperture size associated with the transmit beam 142.

Still with reference to FIG. 1, the path followed by received optical energy is discussed. A receive beam 144 first enters the telescope 102. The receive beam 144 may have been generated, for example, by another optical communication terminal, or by another source of optical transmissions. The receive beam 144 reflects off of the primary mirror 136 and travels toward the secondary mirror 138. The secondary mirror, which is located confocal to the primary mirror, however, collimates the reflected receive beam to direct it into the shared path 108 as received optical energy 146.

Because the received optical energy 146 is formed from energy collected across the entire primary mirror 136, except for the obscuration of the secondary mirror, the diameter of the received optical energy 146 is greater than the diameter of the optical transmit energy 148. The received optical energy 146 is therefore "wrapped around" the optical transmit energy 148. As the received optical energy 146 propagates along the shared path 108, it reflects off of the FTM 116 and travels to the annular mirror 110.

As noted above, the annular mirror 110 includes a hole through which optical transmit energy 148 passes. The annular mirror 110 also includes a reflective portion around the hole. A doughnut-shaped section of received optical energy 146 is therefore reflected by the annular mirror 110 into the receive path 106. A circular portion of received optical energy 146 continues through the hole and into the transmit path 104.

The power contained in the received optical energy 146, however, is typically much smaller in magnitude than power contained in the optical transmitted energy 148. As one example, the power in the optical transmit energy 148 may be approximately 1 Watt, while the power in the received optical energy may be less than a few Nanowatts. Thus, the power present in the portion of the received optical energy 146 that passes into the transmit path 104 is not of sufficient magnitude to affect the operation of the transmit optics or electronics of the optical terminal 100.

The doughnut-shaped section of received optical energy 146 continues along the receive path 106 until it reaches the receive beamsplitter 118. The receive beamsplitter 118 allows a portion of the received optical energy to pass through the beamsplitter 118, through the coupling lens 120, and into the receive fiber 158. The receive beamsplitter 118 also reflects a portion of the received optical energy 146 (tracking energy) along a primary path into the tracking detector system 124.

In the tracking system 124, the tracking energy passes through the (optional) combination of the biconvex lens 126 and biconcave lens 128. The combination effectively increases the focal length of the tracking system 124 and focuses the tracking energy on the first quad-cell detector 132. As shown in FIG. 1, an optional tracking beamsplitter 130 and second quadcell detector 134 may be used to implement a backup tracking sensor for the first quadcell detector 132.

The backup tracking mechanism may be used in addition to, or as a replacement for, the first quad-cell detector 132. In operation, the tracking beamsplitter 130 passes a portion of the tracking energy along the primary path to the first quadcell detector 132 and reflects a portion of the tracking energy along a backup path to the location of the second quadcell detector 134. The backup path is commonly, but need not be, perpendicular to the primary path traveled by the tracking energy to the first quad-cell detector 132.

In one embodiment of the present invention, the receive beamsplitter 118 passes approximately 80% of the energy incident upon it and reflects approximately 20% of the energy incident upon it. The tracking beamsplitter 130 passes approximately 50% of the energy incident upon it and reflects approximately 50% of the energy incident upon it. Thus, the first quad-cell detector 132 and the second quad-cell detector 134 each receive approximately 10% of the total received optical energy reflected by the annular mirror 110.

The first quad-cell detector 132 and the second quad-cell detector 134 may be implemented with identical detectors. For example, the quad-cell detector 132 may use four optical detectors placed closely together to form four quadrants of a circle. Each optical detector produces an output (A, B, C, and D, respectively, for example). The control electronics 154 use the four outputs A, B, C, D to control the FTM 116.

More specifically, the control electronics 154 adjust the FTM 116 (and therefore the position of the tracking energy on the quad-cell detectors 132 and 134 and the amount of received optical energy coupled into the receive fiber 158) in order to center the tracking energy on the quad-cell detector. The control electronics 154 center the tracking energy by adjusting the FTM 116 such that outputs A+B=C+D and A+C=B+D. In the event that the control electronics 154 determine that centering the tracking energy would require adjustments to the FTM 116 which are beyond its range of motion, the control electronics 154 may instead first use the gimbal actuators (described below) to perform a coarse adjustment to the position of the telescope 102.

As one implementation example of the optical communication terminal 100, the transmit aperture is 10 cm in diameter, the receive aperture is 20 cm in diameter, and the transmitter power is 0.5 W. The receive beam and transmit beam wavelength is 1.55 microns and Differential Phase Shift Keyed (DPSK) modulation is applied by the control electronics 154 and carried by the optical transmit energy 148. The above example provides a Bit Error Rate (BER) of $1 \times 10^{-10}$ over a range of 6000 km at a data rate of 6.75 Gbps.

Still with reference to FIG. 1, a beacon transmitter 150 may be provided to generate a beacon beam 152. The beacon transmitter 150 may be implemented, for example, with a space qualified laser diode that emits optical energy at a wavelength of 0.820 microns. This wavelength is particularly suited to detection by a radiation hardened and shielded CCD array, for example CCD 140. It is noted, however, that the beacon beam wavelength may be freely chosen depending on the characteristics of the detector for the beacon beam.

Preferably, the beacon beam 152 is much wider than the transmit beam 142 and the receive beam 144. As an example, the beacon beam 152 may be 3 milliradians in width, while the transmit beam 142 and receive beam 144 may be 100 times narrower. The beacon beam power may be, for example, on the order of 5 mW.

During the acquisition process, the terminal 100 attempts to direct as much of the beacon beam 152 into the telescope 102 as possible. As a result, the primary mirror 136 reflects the beacon beam 152 toward the secondary mirror 138. Preferably, the secondary mirror 138 is formed as a dichroic element (i.e., an element which passes certain wavelengths and which reflects other wavelengths). A dichroic element may be formed, for example, from fused silica with a multilayer dielectric coating. The secondary mirror 138 thereby reflects the transmit optical energy 148 as well as the receive beam 144 while allowing the beacon beam 152 to pass through to reach the CCD 140. The CCD 140, which may be use a grid of several thousand individual detecting elements, preferably covers a field of view of several milliradians.

The communication and control electronics 154 scans the CCD 140, for example at 10 Hz, to determine where the beacon beam energy is incident on the CCD 140. The control electronics 154 may, in response, adjust the FTM 116 or the gimbal actuators (described below) to align the telescope 102 so that the telescope 102 gathers more of the receive energy. In other words, the control electronics 154 help the terminal 100 acquire the receive beam of another terminal and properly point the transmit beam by scanning the CCD 140.

Figure 2:
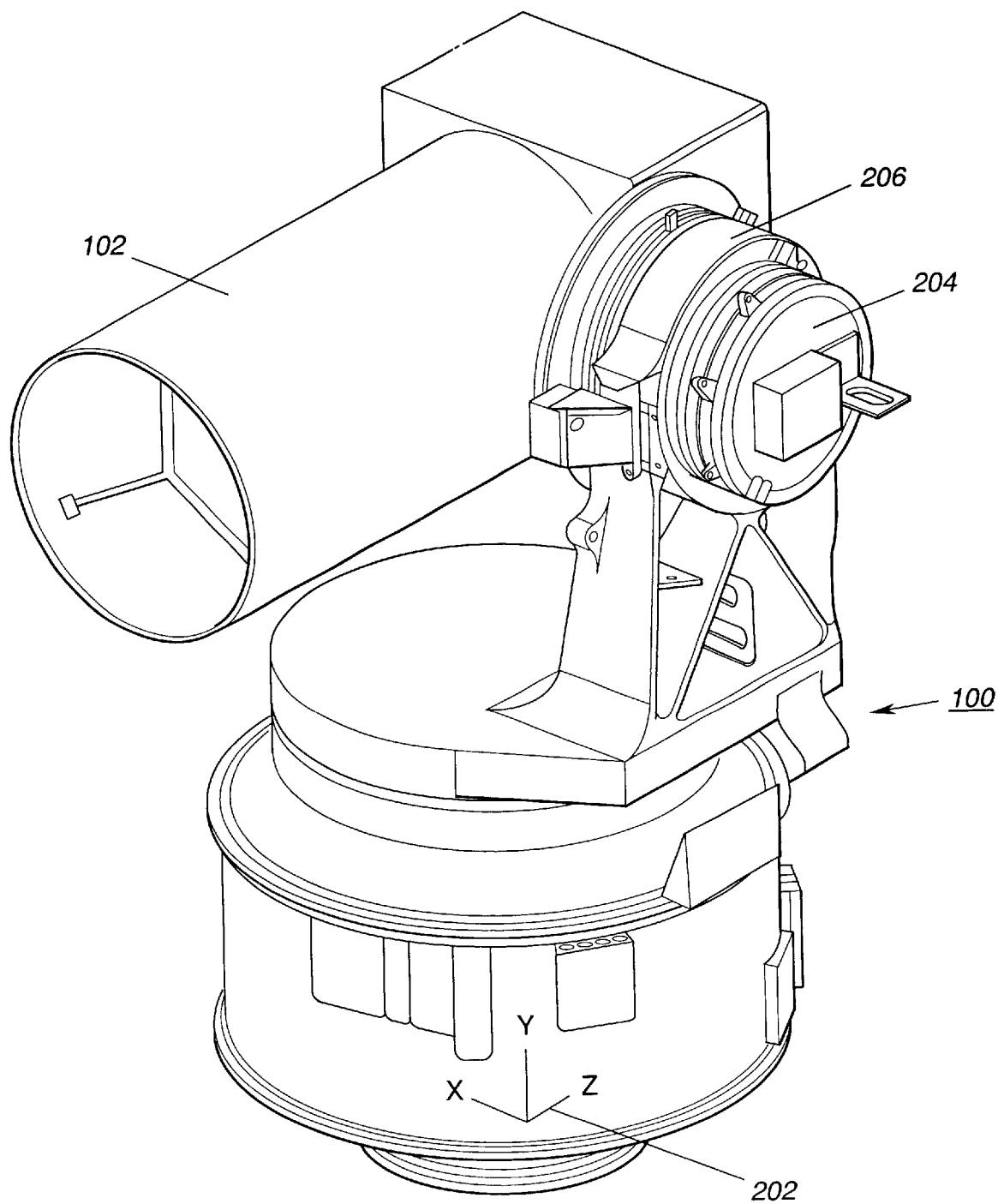
FIG. 2 shows an external view of an optical communication terminal.

Turning now to FIG. 2, that figure shows a view of the optical communication terminal 100, including the telescope 102, and a predetermined coordinate system 202. The terminal 100 includes a two axis gimbal 204 in a single arm 206. The two axis gimbal 204 includes an actuator that rotates the telescope 102 about the X-axis (the elevation axis) of the coordinate system 202. The two axis gimbal 204 further includes an actuator that rotates the telescope 102 about the Y-axis (the azimuth axis) of the coordinate system 202.

The actuators associated with the two axis gimbal 204 operate under the direction of the control electronics 154. As noted above, the actuators may be used to move the telescope 102 during the acquisition process to align the terminal 100 with another terminal, or any other transmitter of optical energy. Furthermore, the actuators may be used to move the telescope 102 during the ordinary course of operation of the terminal 100 in order to maintain full strength reception of the receive beam 142. The actuators are particularly useful when the range of motion of the FTM 116 has been exceeded.

The optical communication terminal 100 described above thus provides a shared telescope 102 between the receive beam 142 and the transmit beam 144. The terminal 100 therefore does not need to compensate for the mechanical stresses that adversely effect conceptual designs for optical terminals that require separate transmit and receive telescopes. Furthermore, the terminal 100 is able to use the telescope 102 during the acquisition process to receive the beacon beam 152. As a result, the terminal 100 achieves cost and complexity advantages over other conceptual optical terminal approaches.

Note also that the structure of the optical communication terminal 100 (including the annular mirror 110) allows the terminal 100 to use the same wavelength for the transmit beam 142 and the receive beam 144 even though the telescope 102 is shared for both the transmit beam 144 and the receive beam 142. Alternatively, the identical structure described above allows the terminal 100 to use a different wavelength for the transmit beam 142 and the receive beam 144.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. An optical communication terminal comprising:

a transmit path along which optical transmit energy propagates;

a receive path along which received optical energy propagates;

a shared path along which both of said received optical energy and said optical transmit energy propagate;

a telescope comprising:
      a housing;
      a primary mirror placed inside said housing, said primary mirror directing a receive beam to a focal point and further directing optical transmit energy out of said telescope in a transmit beam; and
      a secondary mirror placed at said focal point, said secondary mirror directing optical transmit energy from said shared path to said primary mirror and further directing a received beam into said shared path as received optical energy;

an annular mirror positioned along said shared path so that said optical transmit energy passes through said annular mirror from said transmit path into said shared path and so that said received optical energy reflects off of said annular mirror from said shared path into said receive path;

a receive beamsplitter located along said receive path, said receive beamsplitter partially reflecting said received optical energy to generate tracking energy that travels along a primary path; and a first quadrature detector disposed along said primary path to receive said tracking energy.

2. The optical communication terminal of claim 1, further comprising:

a tracking beamsplitter located along said primary path before said first quadrature detector; and further comprising
      a second quadrature detector located along a backup path, said tracking beamsplitter passing a portion of said tracking energy along said primary path and reflecting a portion of said tracking energy along said backup path.

3. The optical communication terminal of claim 2, further comprising:

a biconvex lens located along said primary path before said tracking splitter; and further comprising
      a biconcave lens located along said primary path after said biconvex lens.

* * * * *